United States Patent
Magnan et al.

(10) Patent No.: US 11,019,492 B2
(45) Date of Patent: May 25, 2021

(54) SMART LIGHT FIXTURE COMMUNICATION NETWORK INFRASTRUCTURE AND METHODS OF USE

(71) Applicant: UBICQUIA IQ LLC, Fort Lauderdale, FL (US)

(72) Inventors: Sebastien Magnan, Lachine (CA); Himamshu Prasad, East Cleveland, OH (US); Max Hippolyte Windisch, Lachine (CA)

(73) Assignee: Ubicquia IQ LLC, Fort Lauderdale, FL (US)

( * ) Notice: Subject to any disclaimer, the term of this patent is extended or adjusted under 35 U.S.C. 154(b) by 9 days.

(21) Appl. No.: 16/307,870

(22) PCT Filed: Jun. 20, 2017

(86) PCT No.: PCT/US2017/038298
§ 371 (c)(1),
(2) Date: Dec. 6, 2018

(87) PCT Pub. No.: WO2017/223067
PCT Pub. Date: Dec. 28, 2017

(65) Prior Publication Data
US 2019/0182671 A1 Jun. 13, 2019

Related U.S. Application Data

(60) Provisional application No. 62/352,920, filed on Jun. 21, 2016.

(51) Int. Cl.
*H04W 12/08* (2021.01)
*H04L 29/06* (2006.01)
(Continued)

(52) U.S. Cl.
CPC .......... *H04W 12/08* (2013.01); *H04L 63/107* (2013.01); *H05B 47/19* (2020.01); *F21S 8/086* (2013.01);
(Continued)

(58) Field of Classification Search
CPC ................................. F21S 8/086; F21V 33/00
See application file for complete search history.

(56) References Cited

U.S. PATENT DOCUMENTS

2007/0201540 A1  8/2007  Berkman
2012/0040606 A1  2/2012  Verfuerth
(Continued)

OTHER PUBLICATIONS

International Search Report and Written Opinion issued in connection with corresponding PCT Application No. PCT/US2017/038298 dated Aug. 18, 2017.
(Continued)

*Primary Examiner* — Gregory B Sefcheck
*Assistant Examiner* — Debebe A Asefa

(57) ABSTRACT

Methods, apparatus, systems and articles of manufacture are disclosed to provide a smart lighting infrastructure as a service for at least one of communication or analytics. An example communication node apparatus associated with a light fixture includes a sensor to detect an electronic device in proximity to the communication node apparatus. The example apparatus includes a processor to determine authorization of the electronic device to access a processing infrastructure. The example apparatus includes a communication interface to facilitate access to the infrastructure when the processor determines the electronic device is authorized. In the example apparatus, the processor is to monitor and control access to the infrastructure by the electronic device according to an access condition.

20 Claims, 15 Drawing Sheets

(51) Int. Cl.
*H05B 47/19* (2020.01)
*H04W 84/02* (2009.01)
*F21S 8/08* (2006.01)
*F21V 33/00* (2006.01)

(52) U.S. Cl.
CPC ............ *F21V 33/00* (2013.01); *H04W 84/02* (2013.01); *Y02B 20/40* (2013.01)

(56) References Cited

U.S. PATENT DOCUMENTS

2013/0346229 A1* 12/2013 Martin .................. G06Q 40/04
705/26.3
2014/0222510 A1 8/2014 Martin et al.
2017/0171180 A1* 6/2017 Britt .................... H04W 12/084

OTHER PUBLICATIONS

International Preliminary Report on Patentability issued in connection with corresponding PCT Application No. PCT/US2017/038298 dated Dec. 25, 2018.

* cited by examiner

SMART LIGHT FIXTURE COMMUNICATION NETWORK INFRASTRUCTURE AND METHODS OF USE

CROSS-REFERENCE TO RELATED APPLICATIONS

The present application claims the benefit of priority to U.S. Provisional Patent Application No. 62/352,920, filed on Jun. 21, 2016, entitled "SMART LIGHT FIXTURE COMMUNICATION NETWORK INFRASTRUCTURE AND METHODS OF USE", which is herein incorporated by reference in its entirety.

FIELD OF THE DISCLOSURE

This disclosure relates generally to smart light fixture communication networks, and, more particularly, to methods and apparatus for providing a smart light fixture communication network infrastructure.

BACKGROUND

Globally cities face numerous challenges such traffic, pollution, parking, crime, digital divide, etc. The increasing urban population exacerbates most of these challenges. There is a need to find solutions to improve the lives of its citizens.

BRIEF DESCRIPTION

Certain examples provide a communication node apparatus associated with a light fixture. The example communication node apparatus includes a sensor to detect an electronic device in proximity to the communication node apparatus. The example apparatus includes a processor to determine authorization of the electronic device to access a processing infrastructure. The example apparatus includes a communication interface to facilitate access to the infrastructure when the processor determines the electronic device is authorized. In the example apparatus, the processor is to monitor and control access to the infrastructure by the electronic device according to an access condition.

Certain examples provide a method including detecting, using a sensor in a communication node associated with a light fixture, an electronic device in proximity to the communication node apparatus. The example method includes determining, using a processor in the communication node, authorization of the electronic device to access a processing infrastructure. The example method includes facilitating, using a communication interface in the communication node, access to the infrastructure when the processor determines the electronic device is authorized. The example method includes monitoring and controlling, using the processor, access to the infrastructure by the electronic device according to an access condition.

Certain examples provide a tangible computer readable storage medium including computer readable instructions which, when executed, cause a processor in a communication node associated with a light fixture, to at least: detect, using a sensor in the communication node, an electronic device in proximity to the communication node apparatus; determine authorization of the electronic device to access a processing infrastructure; facilitate, using a communication interface in the communication node, access to the infrastructure when the processor determines the electronic device is authorized; and monitor and control access to the infrastructure by the electronic device according to an access condition.

DETAILED DESCRIPTION

Figure 1:
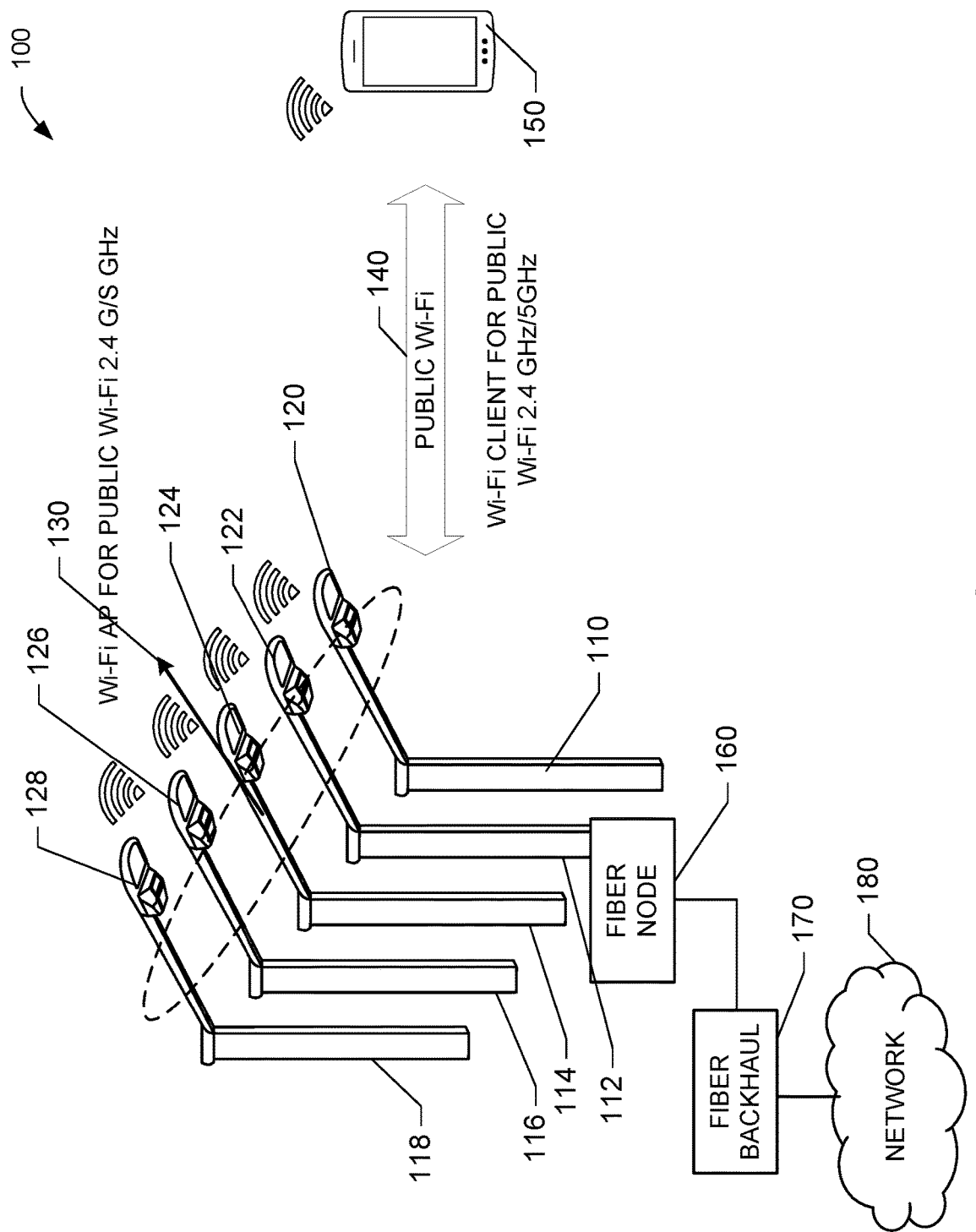
FIG. 1 illustrates an example environment including a plurality of smart lighting poles.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Many applications based on local sensing can be implemented using a local wireless sensor network (WSN) of inexpensive, self-powered, low-energy devices (e.g., Bluetooth™ Low Energy (BLE), ZigBee, 6LoWPAN, etc.), arranged in a star or mesh topology. Such applications, however, typically require one or more local, mains-powered gateways, a connectivity solution, and a cloud infrastructure, to relay the information acquired by the WSN to a cloud application, that can in turn enable scalable, widespread access to that information. For example, some WSNs benefit from being able to reach more than one gateway, such as by distributing the energy consumption across the WSN for data gathering. Such considerations have been prohibitive to small, local applications.

In certain examples, smart lighting fixtures (e.g., street lamps, light poles, such as GE LightGrid™, GE Evolve™, etc.) form a data communication network. The network can form an extension of the other networks, such as the Internet, cellular networks, private networks, etc. For example, since street lights are geographically located near areas of human activity, the poles can reach types of electronic devices relevant for close-proximity applications, that neither the Internet nor the cellular networks can reach directly (e.g., Bluetooth Low-Energy, ZigBee, 6LoWPAN, etc.). In certain examples, the network of street lights connects to a cloud-based platform (e.g., GE Predix™, Amazon AWS™, etc.) back-end to provide enhanced communication, control, analytics, application deployment, monitoring, etc. Thus, "street light network" of poles can provide a comprehensive platform to enable development and deployment of proximity-based applications. In certain examples, the network of smart fixtures forms a data, application, and communication infrastructure that can be provided (e.g., at a cost, etc.) as an infrastructure-as-a-service (IaaS), platform-as-a-service (PaaS), etc. In certain examples, configured instances of the IaaS operate similar to virtual machines (VMs) of a data center to host and facilitate execution of proximity-based applications within line of sight of human users.

Certain examples leverage a network of communicating light poles (e.g., organized in a network such as a star network, mesh network, etc.), to determine a pragmatic meeting point with potential consumers and applications. By renting the proximity real-estate of the smart lighting fixtures, their local processing power, their "inward" connectivity to local WSNs as well as their "outward" connectivity to other network(s) such as wide area network (WAN), local area network (LAN), WiFi, etc., their extended processing power in the cloud platform, and the scalable access to resulting data in the cloud, certain examples enable development of third-party applications, and those applications can in turn create a demand for more smart lighting fixtures.

For example, a local meteorological station implemented with simple sensors can publish its data via a smart fixture and cloud platform to the local community. The meteorological data can be reused at a regional, national, and/or global level.

As another example, advertising outlets (e.g., smart lighting poles and/or other devices connected to them, etc.) that can provide customized messages to nearby consumers using personal area network technology such as Bluetooth™ Low-Energy (BLE) connectivity for the consumer. A street light pole can report attributes of nearby consumers to the cloud platform, and, in return, obtain customized payloads to be published to the consumers over the channel (e.g., BLE; WiFi, etc.). The same idea can be used for non-commercial purposes (e.g., to deliver information, guidance or instructions).

In another example, a shop owner seeks to deploy a network of sensing devices near the shops and/or in collaboration with nearby shops to track affluence, shopping habits, environmental factors affecting affluence, etc. Rather than putting the burden on the shop owner(s) to install receiving gateways, setup connectivity, and procure cloud resources to collect and share that information, providing these resources as an IaaS on a rental and/or subscription basis can alleviate some startup burden and stimulate various tracking solutions using sensing devices.

Certain examples leverage street lamp pole real estate to fill a gap between local WSN-based applications and widespread internet access to data collected by the street lamps and/or other devices in communication with the street lamps. Certain examples help provide an affordable, per-use consumption model for third party developers and/or consumers, focus on platform-level services, and provide a sensible model to allow third party entities to take care of associated applications. Certain examples dynamically distribute the processing burden among the infrastructure depending on the application (e.g., at the edge, in the cloud, etc.). For example, many applications may involve only very minimal processing resources at the edge.

Certain examples provide an on-demand growth path for a network of smart lighting poles (rather than an all-or-nothing situation in which, until the network is large enough, no commercial application can be seriously considered). Certain examples provide an ability to offer various capabilities at various costs. Certain examples facilitate servicing, repair, upgrading, and replacing smart fixtures collaboratively with municipalities, end users, etc.

Certain examples provide a network of smart lighting fixtures having local connectivity with a WSN and in which the infrastructure and associated real estate, processing power, connectivity, and/or cloud resources can be rented, sold, offered as part of a subscription service, etc. In certain examples, instead of or in addition to having sensors on the light fixture poles, sensors can be associated with people near the poles, in the lights on top of the poles, on buildings near the poles, etc. The processing power of widespread light fixtures can be leveraged to enable applications dependent on local sensing and bridge the gap between the Internet (and/or other data/communication networks) and WSNs.

FIG. 1 illustrates an example environment 100 including a plurality of poles 110, 112, 114, 116, 118. A smart lighting fixture 120, 122, 124, 126, 128 is affixed to each pole 110, 112, 114, 116, 118. The smart lighting fixtures 120, 122, 124, 126, 128 include and/or are associated with a light or lighting element, such as a light emitting diode (LED), fluorescent bulb, compact fluorescent (CF) bulb, halogen bulb, etc., to provide light in an area. The smart lighting fixtures 120, 122, 124, 126, 128 serve as access points (AP) 130 to provide wireless communication (e.g., 2.4 GHz/5 GHz WiFi, etc.) over a publicly available channel 140 (e.g., a 2.4 GHz/5 GHz public WiFi client, etc.) accessible by one or more authorized wireless devices 150 (e.g., smartphone, tablet computer, etc.). The network of light fixtures 120-128 connect to a fiber node 160, which facilitates communication with a fiber backhaul 170. The fiber backhaul 170 communicates with a network 180, such as the Internet, private network, virtual private network (VPN), cellular network, etc. over the fiber connection.

As shown in FIG. 1, lighting infrastructure can be used to provide wireless communication (e.g., WiFi, etc.) access. While the example of FIG. 1 illustrates the access point or communication node 130 integrated with the fixture 120-128, the access point 130 or intelligent node can be implemented separate from the fixture 120-128 and communicatively coupled to the fixture 120-128 to facilitate exchange of information, etc.

Thus, the network of light fixtures 120-128 facilitates access to the network 180 for the device 150 via the public wireless network 140 and fiber connection 160, 170. The network of smart light fixtures 120-128 can be arranged according to one or more network configurations such as a star network configuration (e.g., shown in FIG. 2), a mesh network configuration (e.g., shown in FIG. 3), etc.

Figure 2:
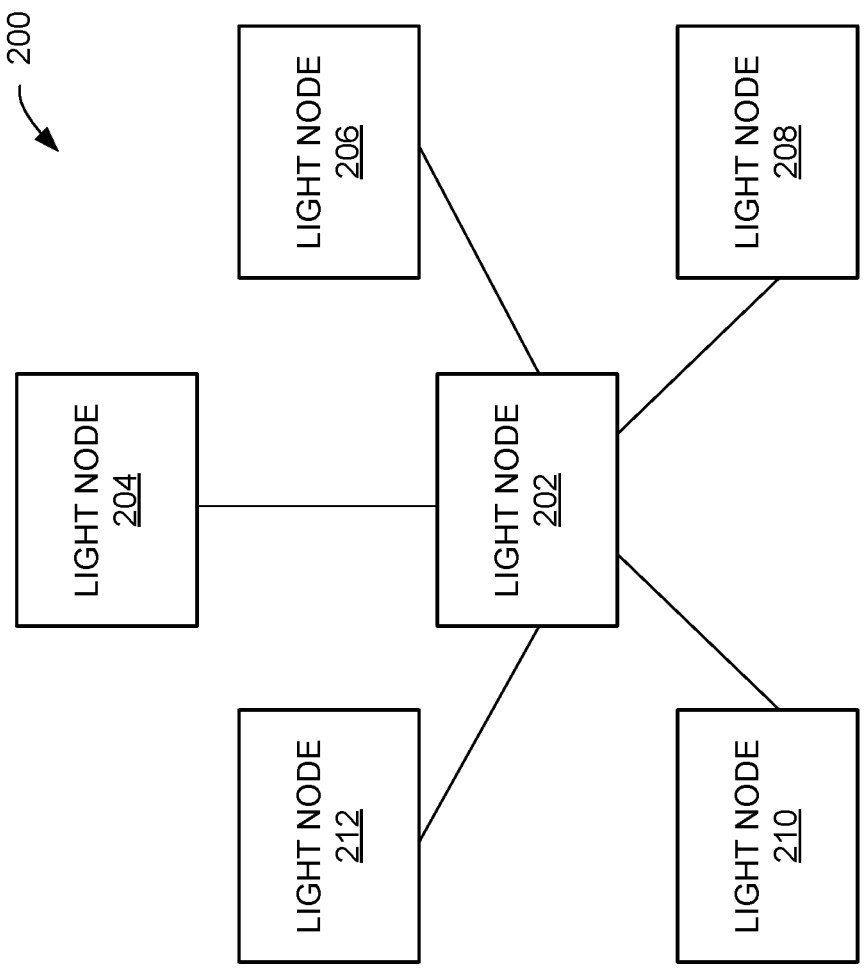
FIGS. 2-3 show example network topologies.

As shown in the example of FIG. 2, a star network topology 200 includes a center node 202 to which all other nodes 204-212 are connected. The hub or center node 202 acts as a hub or switch to serve connected client nodes 204-212 (e.g., according to a hub and spoke message distribution configuration, etc.). A message received by the central node 202 can be rebroadcast to all connected nodes 204-212, for example.

Figure 3:
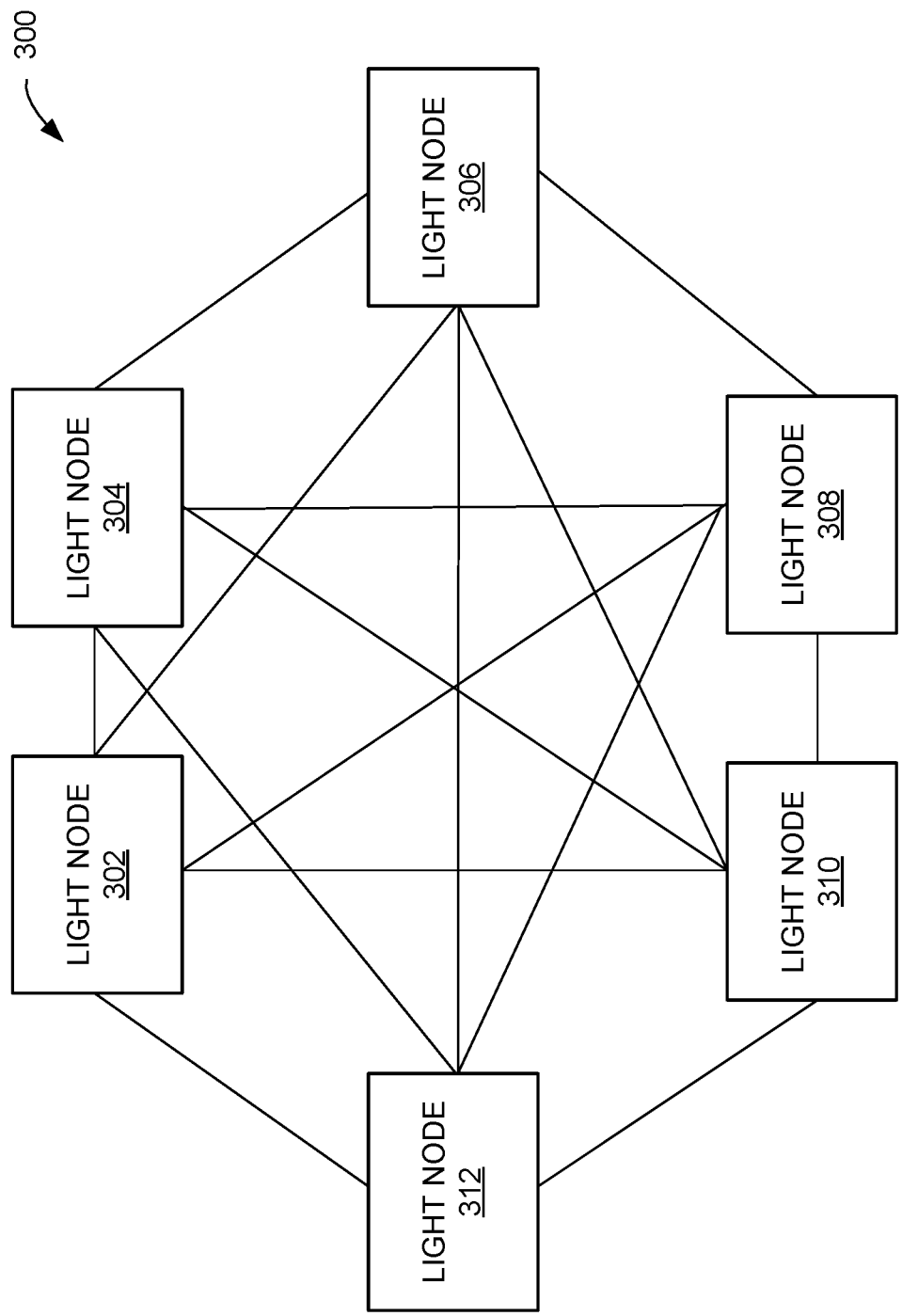

As shown in the example of FIG. 3, a mesh network topology 300 includes a plurality of interconnected nodes 302-312 to route messages from a source to a destination through some or all of the connected nodes. A mesh network 300 in which each node 302-312 is interconnected to all other nodes 302-312 is a fully connected mesh network. In other mesh network 300 implementations, nodes 302-312 are interconnected with other nodes 302-312, but each node 302-312 may not be interconnected with all other nodes 302-312 in the network 300.

The smart fixtures 120-128 can also be interconnected according to a ring network, tree network, mix network, and/or other network device connection configuration, etc.

The smart lighting fixtures 120-128 form a network 130 that can be thought of as an extension of the network 180 such as the Internet, cellular network, etc. The network of smart lighting fixtures 120-128 fills the gap between local "wireless sensing network"-based applications and widespread internet access to the data they collect. The fixtures' "intelligent node" 160 also supports integration of Wi-Fi Access Points to enable ubiquitous public Wi-Fi for nearby device(s) 150. Due to their geographical presence near human activity, the fixtures 120-128 can facilitate communication with device(s) 150 relevant for proximity-based applications that neither the Internet nor the cellular networks can reach directly, for example.

In certain examples, smart lighting fixtures 120-128 include sensors that can provide a customer with a plurality of data regarding its target audience's activity and environment. The fixtures 120-128 can analyze collected data at the edge of the network to minimize or reduce cost of data transfer and latency. Multiple sensors can be used together to perform advanced analytics.

Figure 4:
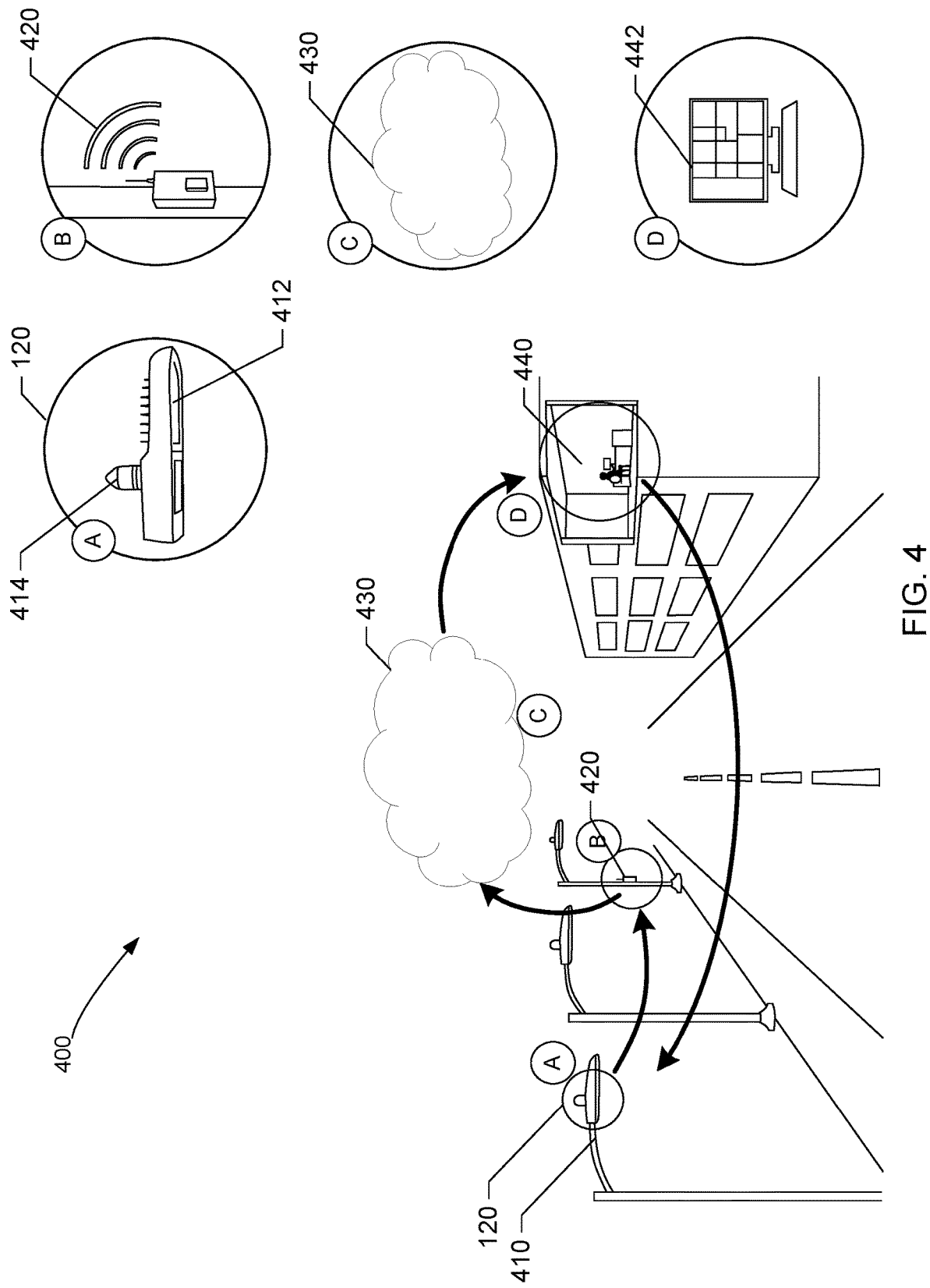
FIG. 4 illustrates another example lighting network system.

FIG. 4 illustrates another example lighting network system 400 in which each street light 410 (e.g., light poles 110-118) includes a smart fixture 120 (e.g., smart fixtures 120-128 of FIG. 1; fixture 120 is shown in the example of FIG. 4 for purposes of illustration only, but fixtures 122-128 can be similarly implemented). The smart fixture 120 includes a light or light fixture 412 and a wireless or "smart" communication node 414. The node 414 can be integrated with the light 412 and/or implemented on or in the street light 410 separate from the light 412. The wireless node 414 can collect data and relay messages with respect to one or more devices and a wireless gateway 420. The gateway 420 communicates with the node 414 to transmit usage data, performance data, device messages, application data, etc. In certain examples, the gateway 420, node 414, and/or fixture 412 can be integrated into a combined device (e.g., smart light fixtures 120-128).

Data is delivered via a backhaul 430 such as a fiber, cellular, and/or Ethernet backhaul to a server which facilitates communication with another network (e.g., the Internet, cellular network, private network, etc.). For example, a user on the street can communicate with a user and/or application hosted in a building 440. For example, a workstation and/or server 442 can execute an application communicating with a user on the street near the street light 410 via a network formed by the node 414, gateway 420 and their backhaul connection 430 to the network. Metering, maintenance, output, and application deployment can be controlled versus the example system 400, for example.

Thus, certain examples combine energy hardware with a digital backbone to enable more reliable and efficient delivery of power, communication, and applications for customers. This ecosystem or infrastructure can be packaged, sold, deployed, and maintained for a variety of users. The smart lighting fixtures 120-128 are networked with sensors that capture usage and consumption data. A cloud-based platform is used to deliver deep analytical insights from the data to fully maximize a customer's assets, which dynamically improves their productivity and efficiency and provides "future proofed" solutions.

Leveraging the smart fixtures 120-128 as part of a digital platform that is open such that small businesses, universities, information technology (IT) personnel, entrepreneurs, other citizens, etc., can access data to solve problems and create new solutions. Infrastructure provided through connected lighting can provide an open digital platform for monitoring, communication, analysis, etc., without expensive, cumbersome and time-consuming civic and/or private infrastructure upgrades. The infrastructure can be provided to users on a metered, subscription, per-use, and/or other contract basis, for example. Lighting fixtures are ubiquitous, non-intrusive and are already wired to receive power from the grid. They are also within line of sight of humans who are potential users of lighting-enabled communication network capabilities. Lighting fixtures 120-128 can be enabled with additional sensor(s) and/or communication node(s) and/or can be manufactured with sensor(s) and/or communication node(s) integrated into the fixtures. Lighting fixtures can also include camera(s), on board storage, etc. In certain examples, sensors and associated analytics enable the smart fixtures to facilitate user detection, vehicle detection, parking occupancy detection, object velocity measurement, vehicle counting, pedestrian counting, occupancy change detection, mobile device communication, etc. The fixtures provide authentication, security, trusted platform, high bandwidth communications, real time streaming protocol (RTSP), external sensor communication, etc. In certain examples, access point(s) can be powered by Power over Ethernet (PoE) port(s).

In certain examples, the smart fixture network communicates with a cloud platform to support device communications and application execution. The cloud platform supports device provisioning for automated registration and provisioning of intelligent nodes for management and software execution and update, for example. In certain examples, the cloud platform supports device decommissioning to decommission a node when the node no longer needs to be managed. Certain examples facilitate configuration management to remotely configure an intelligent node and track changes to the node over the lifetime of the node. In certain examples, the cloud-based platform provides environment(s) to build, test, deploy, and scale applications. In certain examples, the cloud platform supports metering of services via the lighting fixture infrastructure.

Figure 5A:
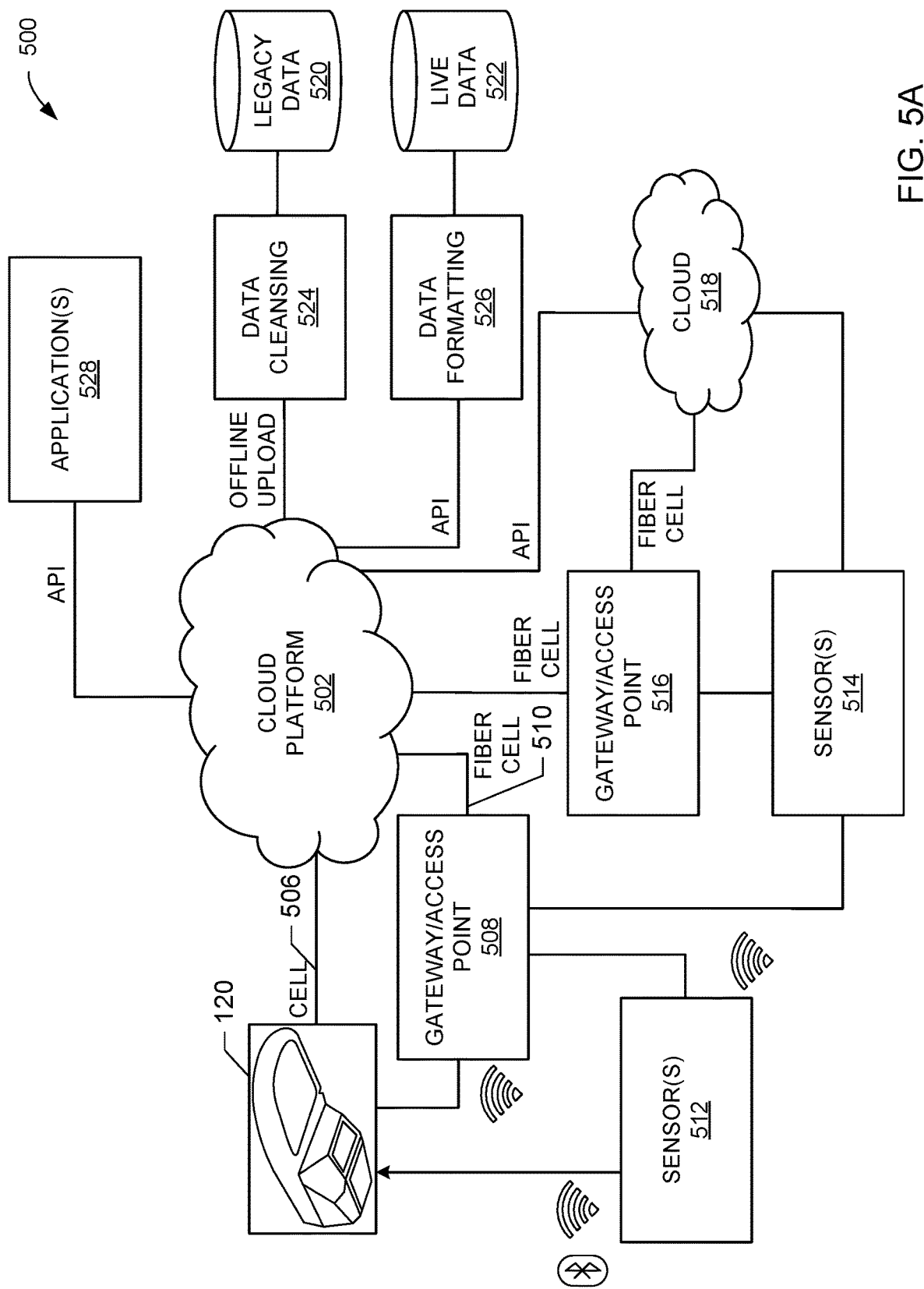
FIGS. 5A-5C illustrates example cloud-based backend systems.

FIG. 5A illustrates an example cloud-based backend system 500 including a cloud platform 502 to which the smart lighting fixture 120 (e.g., smart lighting fixture 120-128) is connected via one or more networks such as a cellular network 506, wired and/or wireless gateway/access point 508, etc. The smart lighting fixture 120 can include a light that includes and/or is connected to a communication node to facilitate data access, data communication, application execution, etc. The gateway/access point 508 communicates with the cloud platform 502 via a fiber and/or cellular data connection 510. Thus, data from the fixture 120 (e.g., video, audio, communication, environment, etc., via the communication node 414 of the fixture 120) is sent to the cloud platform 502 via the cellular or fiber backhaul 506, 510.

As shown in the example of FIG. 5A, sensor(s), such as one or more wireless sensor(s) 512 (e.g., WiFi, BLE, etc.) and/or other sensor(s) 514 can communicate with the cloud platform via the smart fixture 120 and/or gateway/access point(s) 508, 516. Sensor(s) 512 may be in close proximity to the smart fixture 120 and can communicate via wireless communication using the communication node 414 to send data to the cloud platform 502 via the fixture 120 and/or secure gateway/access point 508, for example. The gateway/access point 516 can also connect to an additional cloud 518, which in turn may connect to the cloud platform 502 via an application programming interface (API), for example. For example, sensor 514 data can be provided to the cloud platform 502 via the secure gateway/access point 516 and/or stored in the cloud 518 from which the data can be provided to the cloud platform 502 via API calls.

Data, such as legacy data 520, live data 522, etc., can also be provided to the cloud platform 502 from various databases. Data from a legacy database 502 can be cleansed 524, for example, before loading the data into the cloud platform 502, for example. Data from a live database 522 can be formatted 526 for storage in the cloud platform 502, for example.

Once data is consumed by the cloud platform 502, the data can be enriched with analytics and made available to one or more applications 528 via APIs, for example. Using the cloud platform 502, the smart fixture 120 and/or other electronic devices (e.g., smart phone, tablet computer, laptop, etc.) can be updated (e.g., over the air software and/or firmware update, etc.), for example. Application 528 usage can be metered via the cloud platform 502, for example. Remote monitoring and control can be facilitated for metering, reporting, and alerting, for example, and a locational component can be incorporated through information regarding smart fixture 120 position, for example.

In certain examples, the cloud platform 502 forms the basis for an industrial internet platform to turn real-time operational data into actionable insights (e.g., via the application(s) 528). The cloud platform 502 offers a standardized infrastructure for application(s) 528 to quickly take advantage of operational and business insight for location and proximity-based application(s) 528, such as advertising, collaboration, weather, and/or communication applications, etc. Providing application support and communication connectivity via the cloud platform 502 provides an infrastructure that can be maintained with improved system governance, standardized security vulnerability assessment, release management control and consistency, etc., that can scale to meet different business and application workloads by adjusting capacity on-demand. The infrastructure 500 and its associated support and connectivity can be provided as a service (e.g., IaaS, PaaS, etc.) on the same day it is requested, rather than a typical 6-12 month design and deployment cycle.

Devices on the edge of the cloud-based structure (e.g., smart fixture 120, etc.) facilitate secure, bi-directional connectivity between applications, networks, devices, etc., while also enabling applications (e.g., analytical and operational services, etc.) via the cloud platform 502, for example. Leveraging low-cost, intelligent sensors 512 deployed on or near the fixture 120 allow data to be transmitted directly or through a gateway 508, 516 to the cloud platform 502, for example.

For example, a smart light fixture 120 can detect potential customers outside a store (e.g., within line of sight of the fixture 120, etc.), and the store owner can utilize the infrastructure 500 to communicate with the potential customers' smartphones to send a personalized greeting or special offer based on store, device location, personal history, etc.

Thus, all or part of the example system 500 can be leveraged to facilitate local communication with connected users, transmission of data to the cloud 502 for processing and return, etc. In certain examples, quality of service (QoS) can be based on billing amount, etc., to prioritize among multiple devices. For example, a user paying more for service (e.g., to advertise, to communicate, to execute a program, to store data, etc.) receives more bandwidth, processing power, transmission/reception priority, etc.

The example system 500 can be leveraged locally, globally, and/or in a standalone configuration to facilitate data processing, communication exchange, etc. In a global or expanded configuration (e.g., FIG. 5A), for example, the cloud platform 502, cloud 518, data 520, 522, applications 528, gateways 508, 516, etc., facilitate large-scale sharing of information and resources via the example infrastructure 500. Thus, in the global configuration 500, a plurality of users can communicate and/or access application(s) 528, data 520, 522, and/or other functionality through agreement and/or other negotiation with a service provider via the smart fixture 120. An amount of time, bandwidth, services, etc., and/or other QoS available to a user can be dictated based on fee, priority, preference, (lack of) delinquency in payment, etc.

In a local configuration (e.g., reduced infrastructure 501 of FIG. 5B), for example, the fiber and/or cellular connection(s) 506, 510 may not be present and/or leveraged to enable broader cloud 518 and/or 502 access via gateways 516 and/or 508, etc. Thus, in the local configuration 501, local users can communicate and/or access information via the cloud platform 502 directly 506 and/or via the access point 508. A localized group of users can share, communicate, participate in electronic activity via the local infrastructure 501 facilitated by the smart fixture 120 and its network infrastructure 501. QoS can be a factor in the localized configuration as well.

In a standalone configuration (e.g., reduced infrastructure 503 of FIG. 5C), for example, the intelligent fixture 120 creates a standalone connection or "hot spot" for localized sharing via the access point 508 without connection to an external gateway 516, cloud 502, 518, etc. Thus, in the standalone configuration 503, a local user can share and/or access information via a "mobile hot spot" formed using the smart fixture 120 and the access point 508. For example, a user can share content from a mobile device to one or more adjacent users via the mobile hot spot formed by the fixture 120 and access point 508 in standalone configuration 503.

Figure 5B:
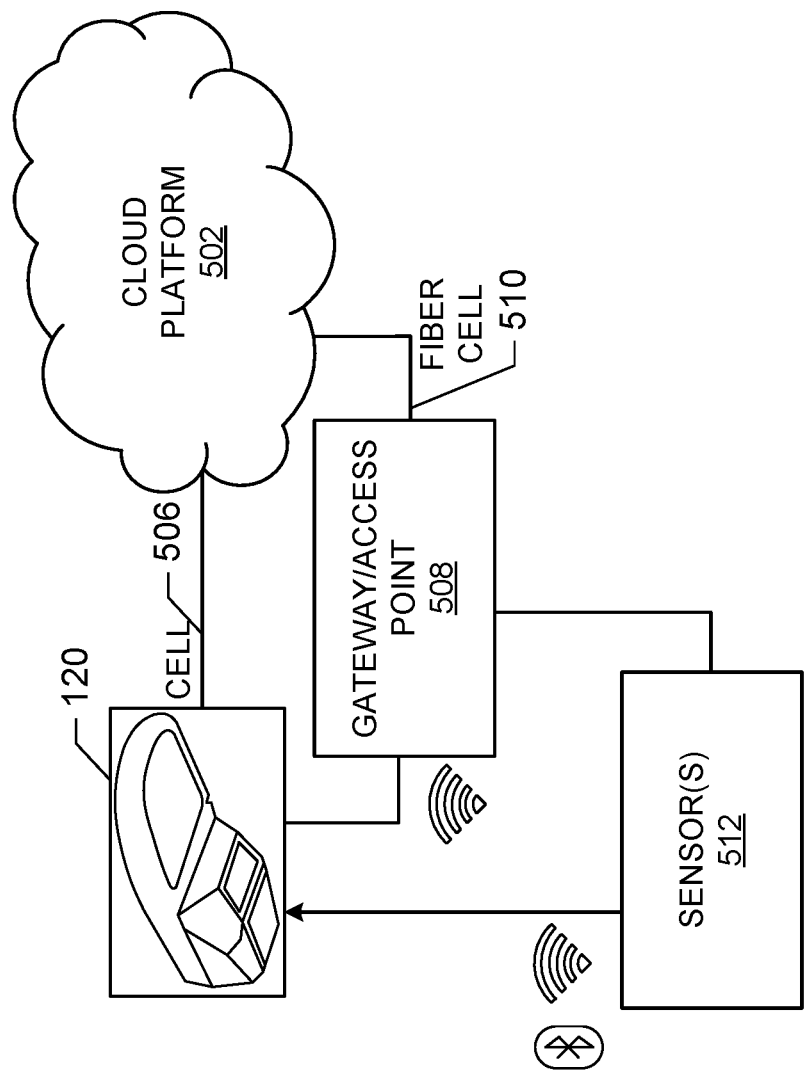
Figure 5C:
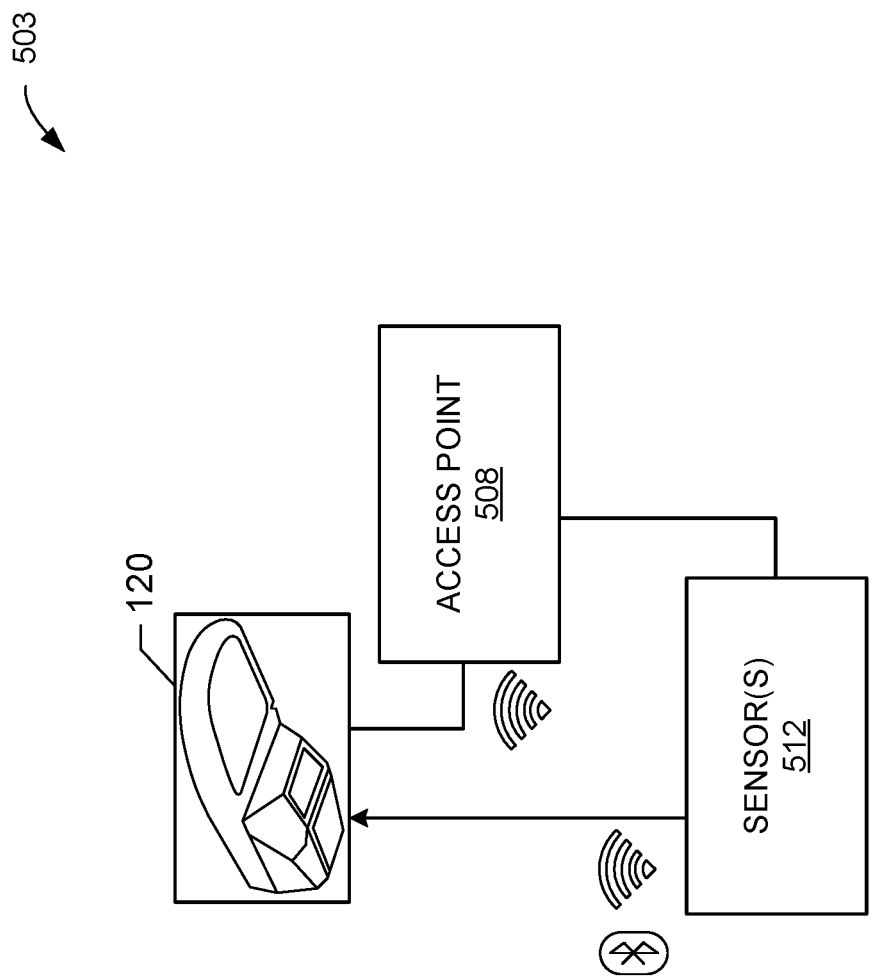
Figure 6:
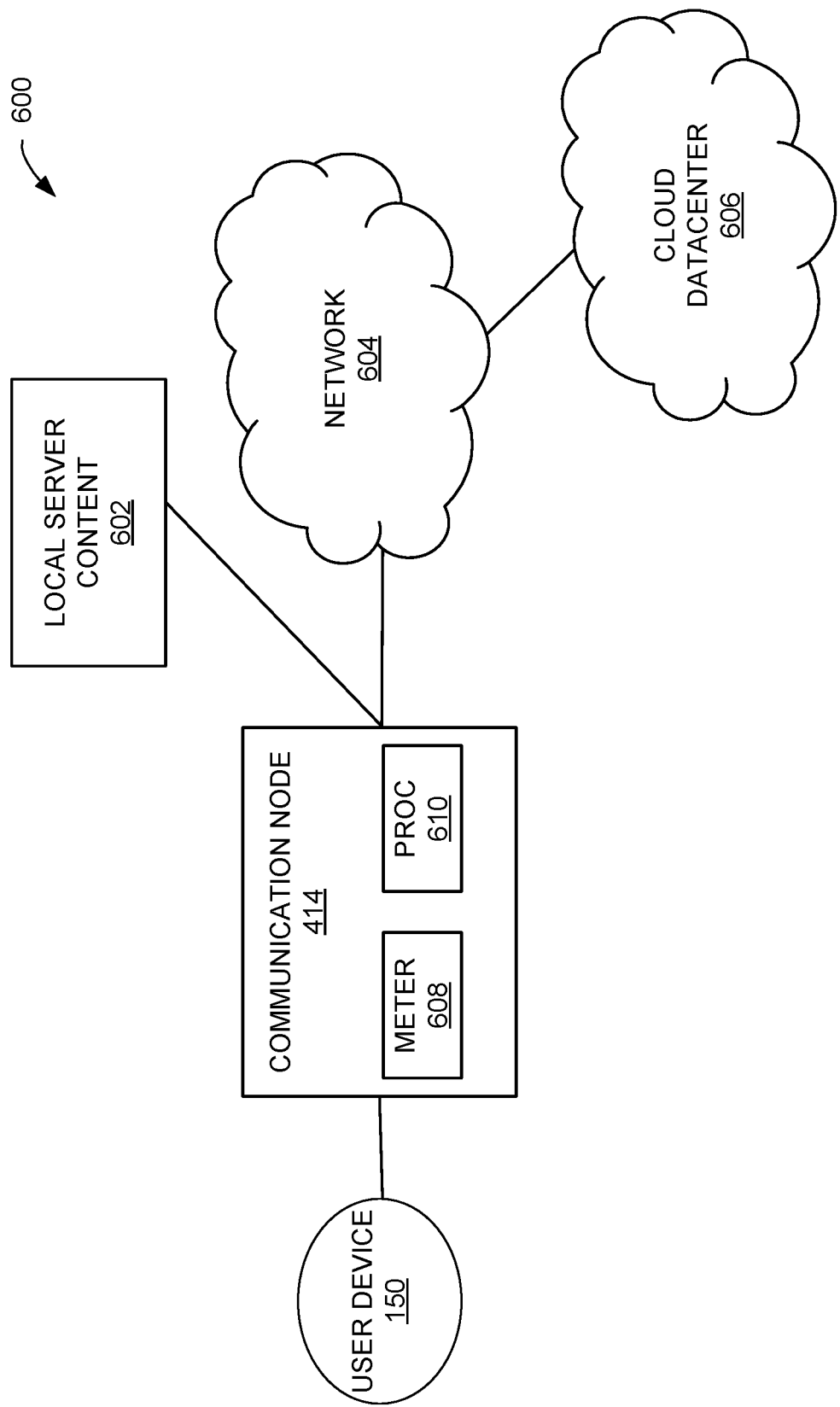
FIG. 6 illustrates an example system in which the communication node of the example smart fixture allows a user device to access content, application(s), service(s), etc., via the node.

As described above, one or more of the network configurations of FIGS. 5A-5C can be used to facilitate data access, communication, application execution, etc., for one or more electronic devices within range of the smart fixture 120. FIG. 6 illustrates an example system 600 in which the communication node 414 of the smart fixture 120 allows a user device 150 (e.g., cellular phone, tablet, laptop, etc.) to access content, application(s), service(s), etc., via the node 414. As shown in the example of FIG. 6, the "smart" wireless communication node 414 can facilitate connection and/or other access of the device 150 to local content 602 and/or remote content via a network 604, such as a cloud datacenter 606. Thus, a local content provider (e.g., a local shop, restaurant, other business, advertiser, etc.) can leverage the communication node 414 to provide local 602 and/or remote 606 content to the user device 150. In certain examples, the communication node 414 can "rent" processing power to the device 150 from the communication node 414, local node 602, cloud datacenter 606, etc. As shown in the example of FIG. 6, the communication node 414 includes a meter 608 to track access to content (e.g., count up to charge the user for access, count down to track a time limit for access, etc.). The communication node 414 includes a processor 610 to facilitate device 150 access, allocate/rent processing power, etc.

In certain examples, the content provider and/or the communication node 414 can limit and/or otherwise control access to content 602, 604 and/or processing power via the node 414. For example, access to content and/or processing power 602, 606 via the node 414 can be limited by duration, time of day, amount of data transferred, user identification, payment, etc. In certain examples, access is provided while the user device 150 is within a certain distance or range of the node 414, and access ends when the device 150 is out of range of the node 414. In certain examples, access is provided for a first period of time at no charge and for a second period of time at a charge and/or based on agreement and/or participation according to terms of the content provider. In certain examples, first content is available at no charge while the device 150 is within range of the node 414, and second content is made available for a fee and/or other agreement while the device 150 is within range of the node 414.

Thus, the communication node 414 can be used as an edge device to support local and/or third party users as a secondary communication network to access local content 602 and/or remote network 604 content such as cloud datacenter 606 content. In certain examples, an operator of the fixture 120 can generate and collect analytics, metering, and usage statistics as well as rent, license, and/or otherwise provide access to third party user(s).

Figure 7A:
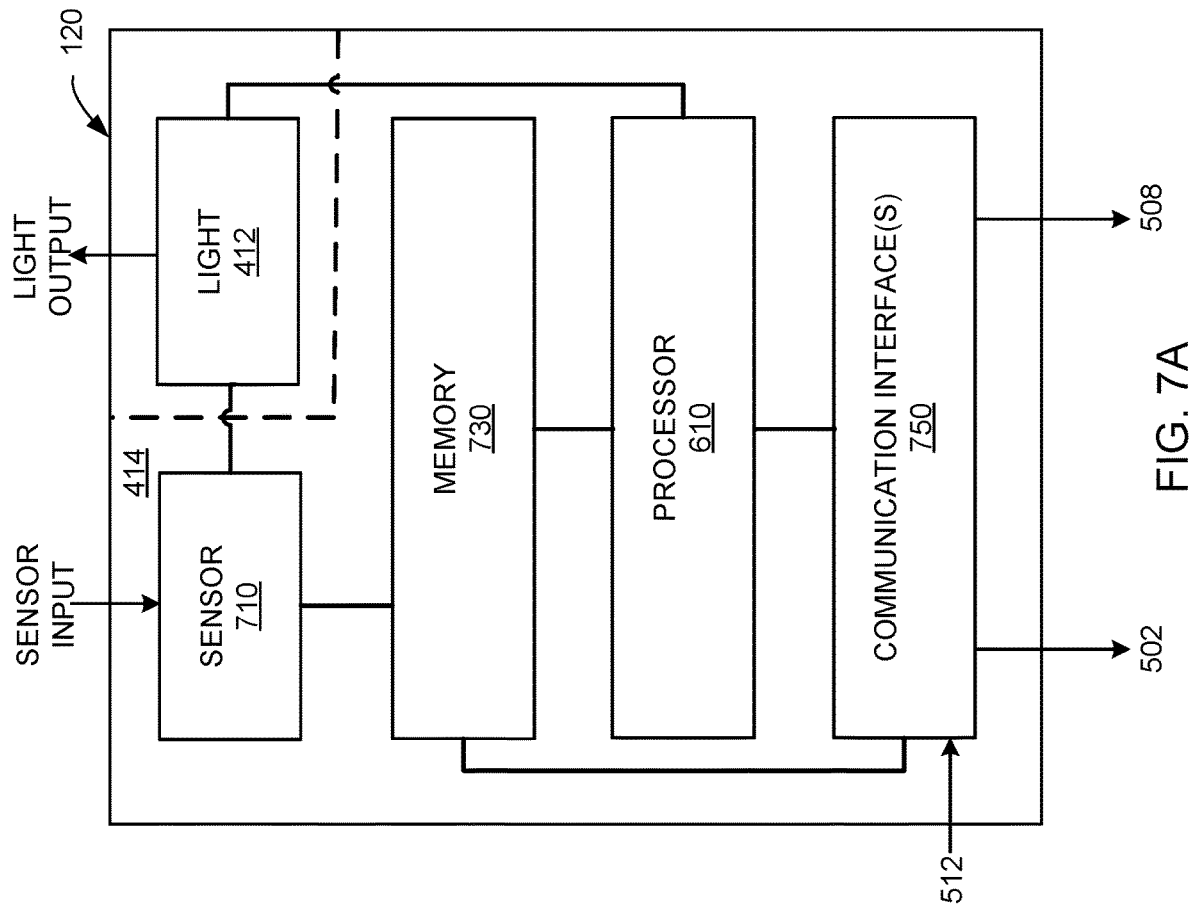
FIGS. 7A-7B illustrate more detailed implementations of the example smart fixture.
Figure 7B:
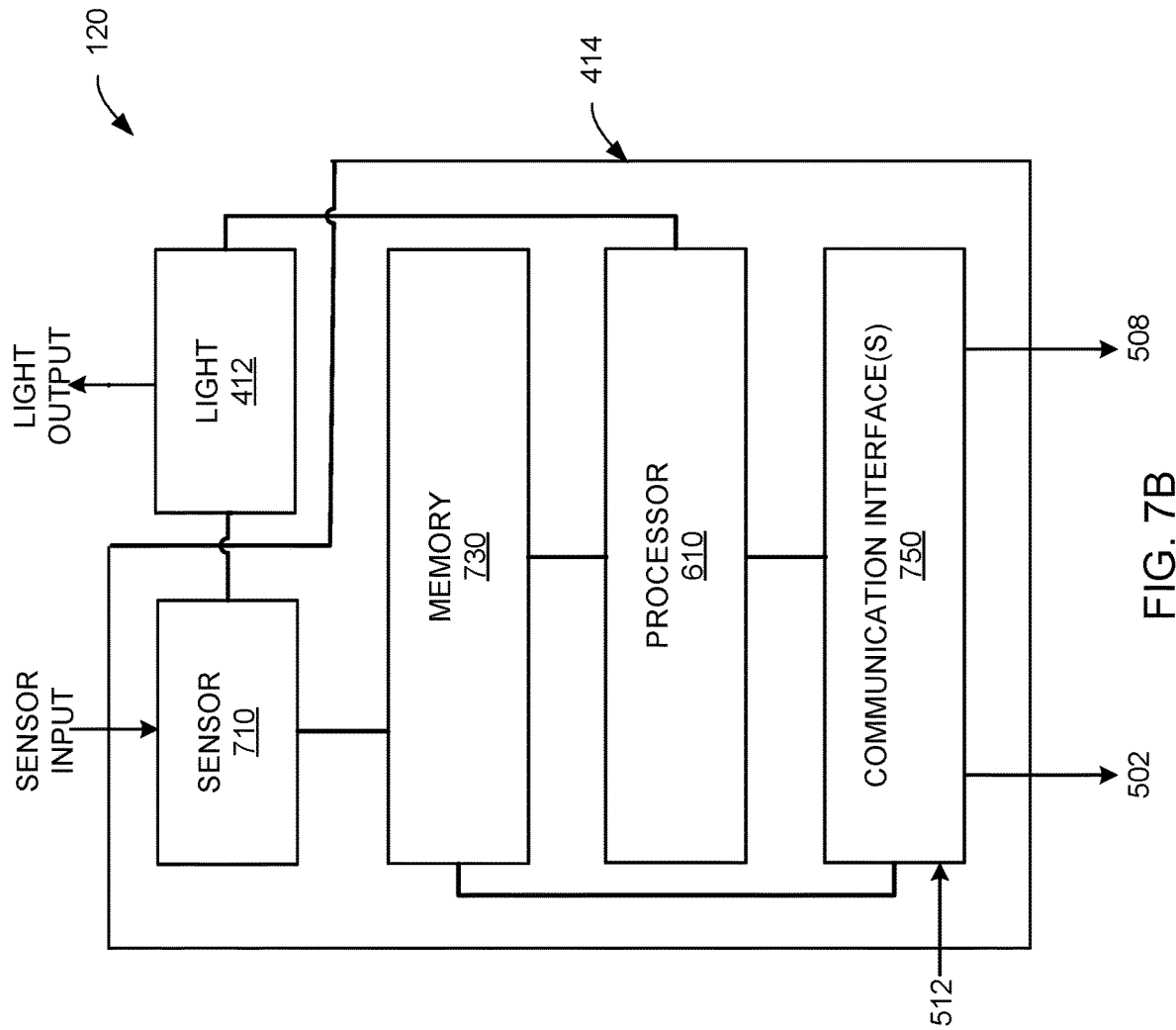

FIGS. 7A-7B illustrate more detailed implementations of the example smart fixture 120. In the example of FIG. 7A, the light 412 and the communication node 414 are integrated in the smart fixture 120. The example of FIG. 7A includes a sensor 710 to receive sensor input from nearby objects (e.g., proximity input regarding people and items within range of the sensor 710, etc.). The light 412 generates a light output (e.g., an LED light output, fluorescent light output, halogen light output, etc.). In certain examples, the light 720 is controlled by feedback from the sensor 710 and/or a processor 610. The sensor 710 can store collected data in a memory 730 accessible by the processor 610. The processor 610 can communicate with one or more communication interfaces 750 (e.g., WiFi, BLE, ZigBee, 6LoWPAN, cellular, etc.) to send and receive data. For example, the communication interface(s) 750 can receive data from third party sensor(s) 512 and send data via cellular connection 506 to the cloud platform 502 and/or via wireless connection to the gateway/access point 508.

Using the sensor 710 and communication interface 750, the processor 610 can process incoming data to generate outgoing data, instructions, analysis, etc. The processor 610 can store information in the access. memory 730, such as data, a usage meter (e.g., data usage, communication bandwidth usage, communication type usage, sensor usage, processing power usage, subscription information, etc.), analytics rules, etc. In certain examples, resources of the processor 610 can be made available to the device 150 to allow the device 150 to offload some processing to the processor 610, for example. In certain examples, the processor 610, alone or in conjunction with the memory 730, can implement the meter 608 to meter and/or otherwise track device 150 activity.

In certain examples, such as shown in FIG. 7B, the smart fixture 120 is divided into the light 412 and a separate communication node 414. Thus, the light 412 can be separate from the communication node 414 but connected to the communication node 414 as described above (e.g., on the same pole 110, etc.).

In certain examples, the smart fixture 120 (e.g., the communication node 414 of the fixture 120, etc.) can be rented (e.g., usage of the smart lighting fixture 120, processing power of the smart fixture 120, connectivity of the smart fixture 120, etc.) to provide an affordable, per-use consumption model, subscription-based model, etc., for third party developers or consumers. In certain examples, the fixture 120 can offer various capabilities at various costs. A rental, subscription, etc., enables the development of applications which in turn can create a demand for more smart lighting fixtures and grow the network of fixtures. The network also provides a sensible model to let third party entities develop applications and distribute the processing burden to the edge or in the cloud via the infrastructure. Thus, the smart fixture 120 can create a first network to facilitate connection of users to the first network. The first network then enables access to a second network, such as a cloud-based platform and/or other processing infrastructure, for example.

In certain examples, the infrastructure 100, 400, 500, 501, 503, 600 can be monitored via the cloud platform 502 from a Web-based interface. Data/processing usage and other operational data can be stored in a central cloud database and made accessible via the interface. A Web-based interface linked to the lighting controls allows authorized users to remotely visualize real-time performance of the lighting system and view metrics regarding data communication, processing, application deployment, etc. GPS and/or other location identification allows users to identify usage and performance of specific smart lighting fixtures in specific locations. Resources (e.g., smart lighting fixtures, etc.) can be grouped, divided, activated, and/or deactivated according to demand, etc. Updates to smart light fixture software and/or firmware can be provided as well.

Additional software capabilities include scheduling, customized reporting, grouping, and user access level management, for example. Schedules can be stored at the street lighting fixture, providing continued performance during network disruptions, for example.

While example implementations of the infrastructures 100, 200, 300, 400, 500, 600, and their components are illustrated in FIGS. 1-7B, one or more of the elements, processes and/or devices illustrated in FIGS. 1-7B may be combined, divided, re-arranged, omitted, eliminated and/or implemented in any other way. Further, the example smart fixture 120, light 412, communication node 414, sensor 710, memory 730, processor 610, communication interface(s) 750, and/or, more generally, the example systems 100, 200, 300, 400, 500, 501, 503, and/or 600 of FIGS. 1-7B may be implemented by hardware, software, firmware and/or any combination of hardware, software and/or firmware. Thus, for example, any of the example smart fixture 120, light 412, communication node 414, sensor 710, memory 730, processor 610, communication interface(s) 750, and/or, more generally, the example systems 100, 200, 300, 400, 500, 501, 503, and/or 600 of FIGS. 1-7B can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example smart fixture 120, light 412, communication node 414, light 710, memory 730, processor 610, communication interface(s) 750, and/or, more generally, the example systems 100, 200, 300, 400, 500, 501, 503, and/or 600 of FIGS. 1-7B is/are hereby expressly defined to include a tangible computer readable storage device or storage disk such as a memory (e.g., a read only memory (ROM), hard drive, flash memory, other volatile and/or non-volatile memory, etc.), a digital versatile disk (DVD), a compact disk (CD), a Blu-ray disk, etc. storing the software and/or firmware. Further still, the example systems of FIGS. 1-7B may include one or more elements, processes and/or devices in addition to, or instead of, those illustrated in FIGS. 1-7B, and/or may include more than one of any or all of the illustrated elements, processes and devices.

Figure 8:
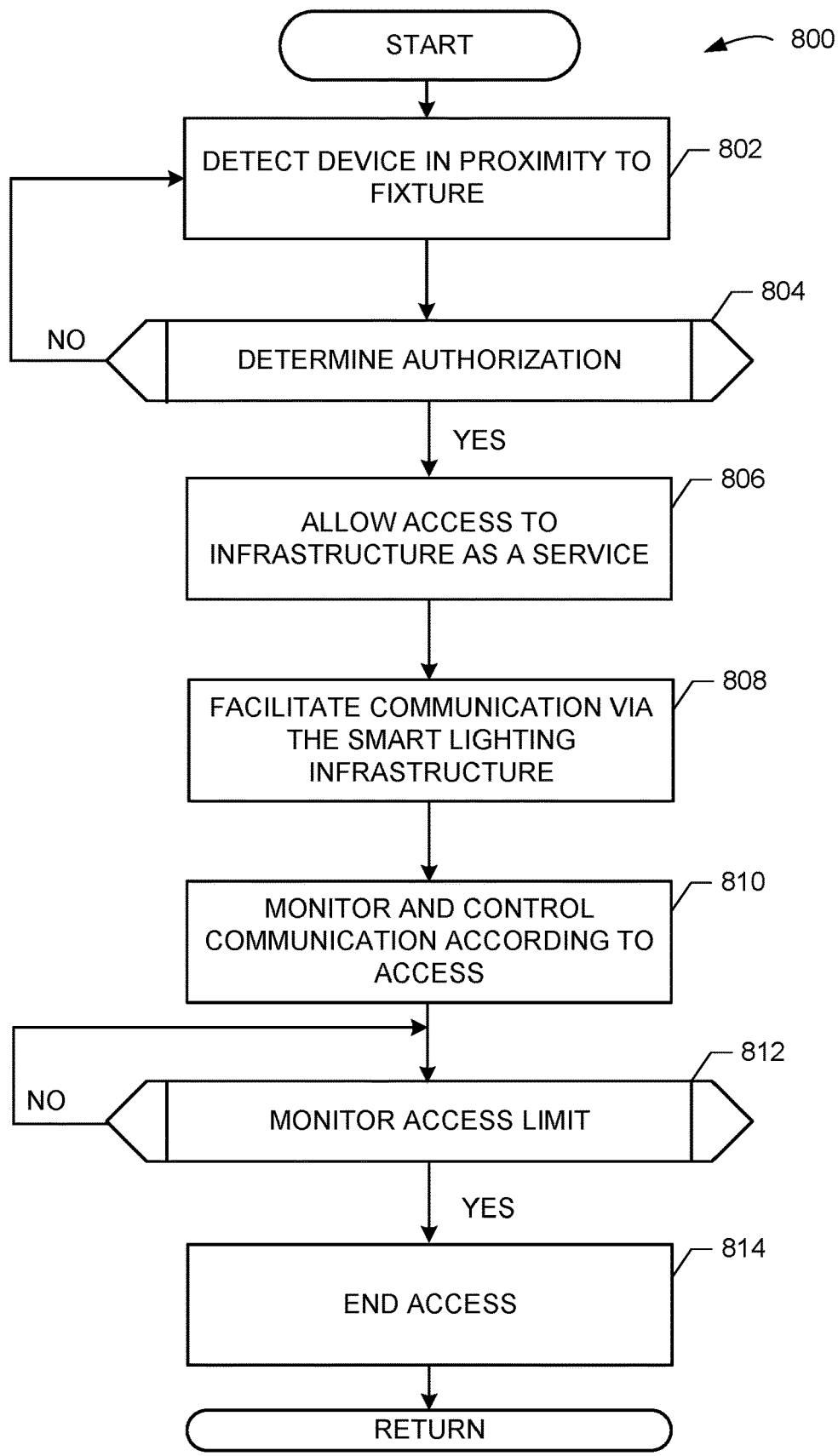
FIG. 8 is a flow chart representative of example machine readable instructions that may be executed to implement the example systems of FIGS. 1-7B.
Figure 9:
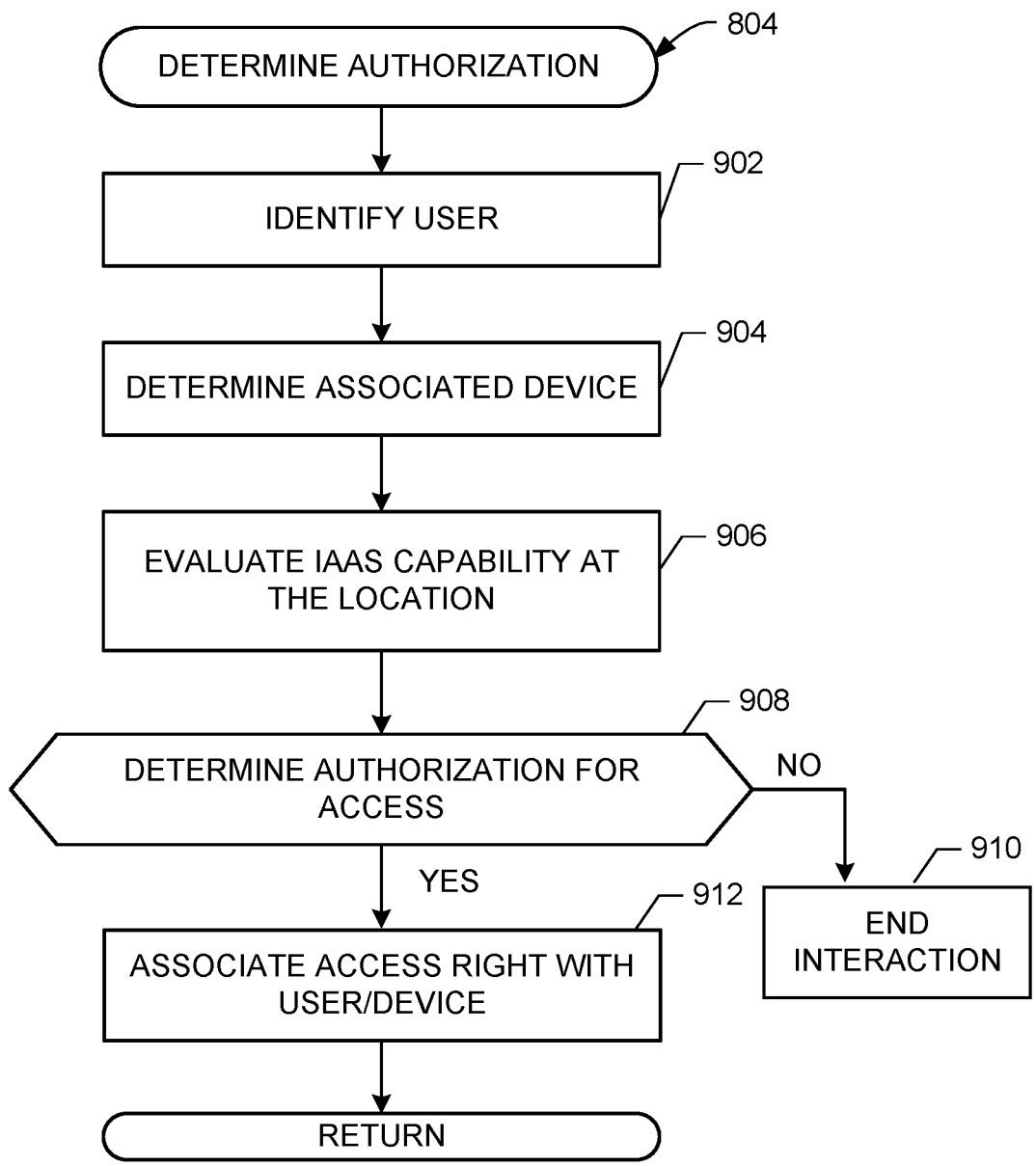
FIGS. 9-10 provide further detail regarding an example implementation of portions of FIG. 8.
Figure 10:
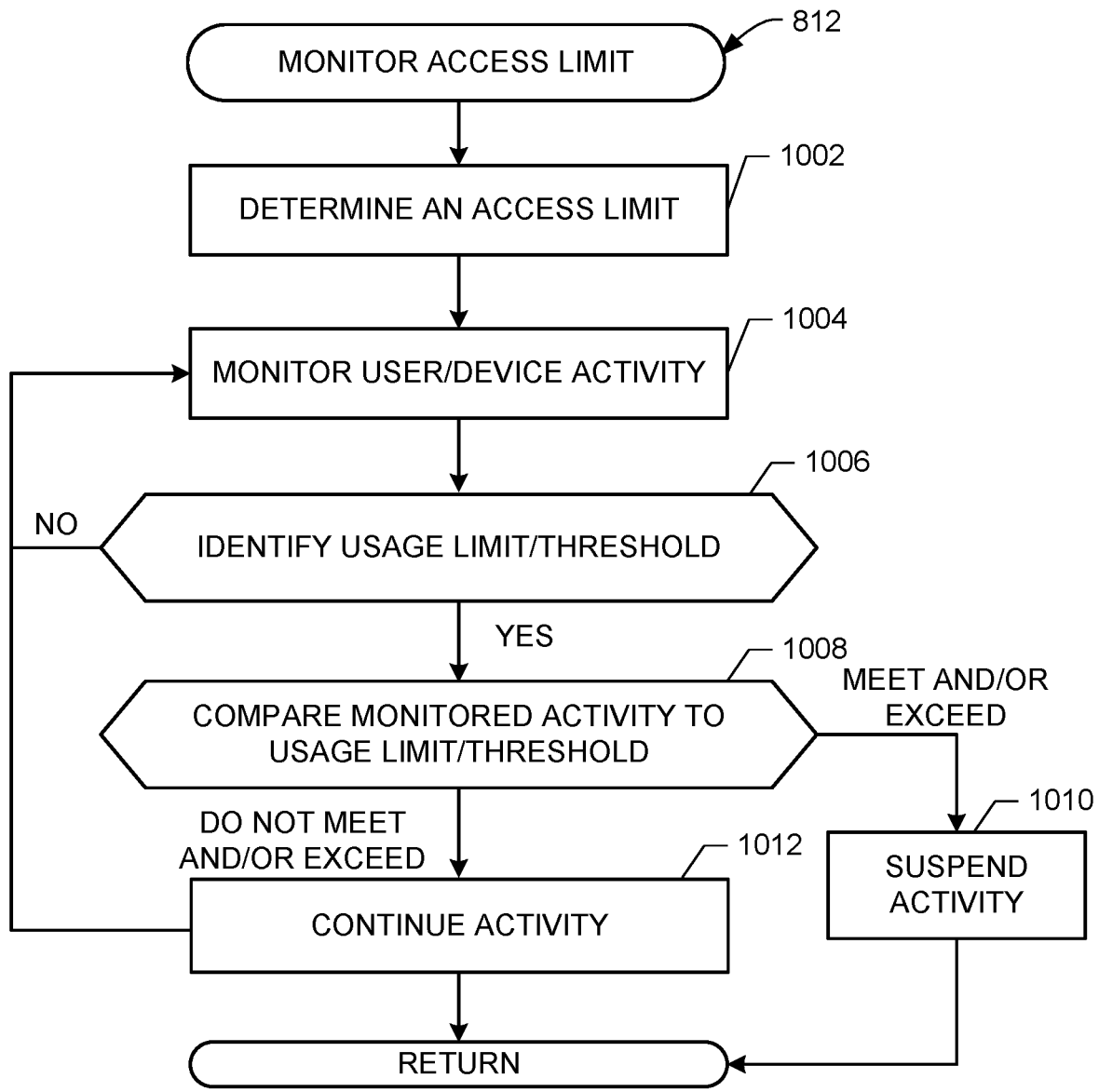

Flowcharts representative of example machine readable instructions for implementing the infrastructure systems 100, 200, 300, 400, 500, 501, 503, and/or 600 of FIGS. 1-7B are shown in FIGS. 8-10. In these examples, the machine readable instructions comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example programs are described with reference to the flowcharts illustrated in FIGS. 8-10, many other methods of implementing the example systems 100, 200, 300, 400, 500, 501, 503, and/or 600 may alternatively be used. For example, the order of execution of the blocks may be changed, and/or some of the blocks described may be changed, eliminated, or combined.

As mentioned above, the example processes of FIGS. 8-10 may be implemented using coded instructions (e.g., computer and/or machine readable instructions) stored on a tangible computer readable storage medium such as a hard disk drive, a flash memory, a ROM, a CD, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 800 of FIG. 8 begins at block 802 at which an electronic device 150 is detected in proximity to a smart lighting fixture. For example, the smart fixture 120 may include a proximity sensor 710 and/or the electronic device 150 (e.g., cellular phone, tablet computer, laptop computer, etc.) may communicate with a communication interface 750 of the smart fixture 120 to establish communication (e.g., via WiFi, BLE, cellular, etc.).

At block 804, authorization of the electronic device 150 is determined by the smart fixture. For example, a processor 610 identifies a user associated with the electronic device 150 to evaluate whether that user is authorized (e.g., has a contract or agreement) to use a service associated with the smart fixture 120. In some examples, access to some or all services is available to all nearby devices 150. In some examples, access to some or all services is based on a per-usage charge, account, subscription, and/or other agreement. Authorization can be based on individual user and/or can be provided by a third party (e.g., a store owner, municipality, corporation, etc.) to users within line of sight and/or other proximity to the smart fixture 120, for example.

For example, an individual user may have a subscription and/or rental for access. Alternatively or in addition, a nearby store owner may have a rental and/or subscription to provide communications and/or application(s) to users within proximity of the smart fixture 120 (and, therefore, within proximity of the store), for example.

At block 806, if the device 150 is authorized, then access to an infrastructure associated with the smart lighting fixture 120 (e.g., the communication node 414, etc.) is allowed. For example, access by the electronic device to the infrastructure 500, 510, 503, 600 to which the smart fixture 120 belongs is allowed when access is open and/or the electronic device 150 is authorized for the access.

At block 808, communication by the electronic device 150 with another network is facilitated via the smart lighting fixture 120. For example, communication with another network 180, such as the cloud platform 502, third party cloud 518, application 528, local content 602, network 604, cloud datacenter 606, Internet, private network, cellular network, etc., is facilitated by the smart lighting fixture 120 for an authorized electronic device 150. For example, users within line of sight of a light pole 110-118 can access one or more applications 528.

At block 810, communication is monitored and controlled by the smart fixture according to parameter(s) of the access. For example, the processor 610 can meter data rate, data bandwidth, application usage, communication interface 750 and/or processor 610 usage, sensor 710 usage, light 412 usage, etc., based on available resources, agreement, subscription/rental type, etc.

At block 812, a limit associated with the authorized access is monitored. At block 814, if a prescribed limit has been reached, then access is ended. For example, if a rental period, subscription limit, data/processing/communication threshold, QoS barrier, etc., has been reached, then the smart fixture 120 halts access. Access can be restarted according to time period, rental/subscription agreement, etc.

For example, the lighting infrastructure 100, 200, 300, 400, 500, 501, 503, 600 can be used by third parties for data communication. The infrastructure acts as a pass-through to another network 180, 602 (e.g., Internet, cellular network, private network, cloud platform 502, third party cloud 518, etc.) by providing secure communication (e.g., by wireline (e.g., fiber) and/or wireless (cellular) backhaul). Billing can be based on one or more criterion such as an amount of data transmitted, frequency of data transmitted, Quality of Service (e.g., if the data needs or wants priority), processor time, etc. Third parties communicate with the lighting infrastructure 100, 200, 300, 400, 500, 501, 503, 600 using wireline (e.g., PoE port) and/or wireless (e.g., Wi-Fi, BLE, Bluetooth, etc.).

In another example, the lighting infrastructure 100, 200, 300, 400, 500, 501, 503, 600 can be used by third parties for data analytics and/or communication. The infrastructure is used to provide compute capability in the edge (node) 414 and/or in the cloud 502, 604 based on data that is provided by the third parties. Billing can be based on an amount of processor usage, memory usage, frequency of usage, bandwidth usage, Quality of Service (e.g., if the analytics needs and/or wants priority), etc. Third parties communicate with the lighting infrastructure 100, 200, 300, 400, 500, 501, 503, 600 by wireline (e.g., PoE port) and/or wireless (e.g., Wi-Fi, BLE, Bluetooth, etc.). If the infrastructure is also used for data communication (e.g., pre- and/or post-analytics), billing can also include data transmission cost.

In another example, the lighting infrastructure 100, 200, 300, 400, 500, 501, 503, 600 can be used in a variety of configurations. For examples, the smart light fixture 120 (e.g., communication node 414, etc.) can be used in a standalone configuration using a single intelligent node for communications and/or analytics. In a local configuration, a group of intelligent nodes (e.g., smart fixtures 120-128) for communications and/or analytics. In a global configuration, the group of intelligent nodes (e.g., smart fixtures 120-128) are used for communications and/or analytics, and the cloud platform 502 (e.g., GE's Predix™ platform, etc.) is also used for analytics.

FIG. 9 provides further detail regarding an example implementation of block 804 to determine authorization of the electronic device by the smart fixture. In the example of FIG. 9, at block 902, the user is identified. For example, a username and/or other identifier, characteristic, etc., associated with the user is identified and/or otherwise retrieved from the user and/or a device 150 associated with the user such as a smart phone, tablet, laptop, etc. The user can be explicitly identified (e.g., using username, email address, phone number, street address, etc.) and/or inferred (e.g., using device information, environment, context, etc.) to identify the user, for example.

At block 904, a device 150 associated with the user is determined. For example, the device 150 (e.g., a smart phone, tablet, laptop, etc.) can transmit an identifier indicating a type, model, etc., of the device, and/or the device 150 can be queried to determine its type, model, etc. A type of device 150 can be inferred based on information transmitted by the device 150 such as communication format/protocol, content, number of radios transmitting, etc.

At block 906, an IaaS capability at the location is evaluated. For example, the location may have standalone, local, and/or global infrastructure and connectivity, as described above with respect to FIGS. 5A-5C and 6. The functionality (e.g., data storage, application access/executability, communication, etc.) is evaluated with respect to the device 150 and/or user to determine availability and authorization.

At block 908, authorization for access is determined. For example, an IaaS capability at the location is evaluated and compared against the user and/or device 150 identification to determine authorization for access by the user and/or device 150 to the IaaS at the location. For example, the location may have standalone, local, and/or global infrastructure and connectivity, as described above with respect to FIGS. 5A-5C and 6. The identified user and/or device 150 may have access to certain functionality based on user identification, device identification, location, IaaS capability, proximity, context, environmental conditions (e.g., available bandwidth, available storage, available processor power, security, access control, role, etc.). The functionality (e.g., data storage, application access/executability, communication, etc.) is evaluated with respect to the device 150 and/or user to determine user and/or device 150 authorization for access to the infrastructure and/or associated application(s) at the location.

For example, a processor 610 identifies a user associated with the electronic device 150 to evaluate whether that user is authorized (e.g., has a contract or agreement) to use a service associated with the smart fixture 120. In some examples, access to some or all services is available to all nearby devices 150. In some examples, access to some or all services is based on a per-usage charge, account, subscription, and/or other agreement. Authorization can be based on individual user and/or can be provided by a third party (e.g., a store owner, municipality, corporation, etc.) to users within line of sight and/or other proximity to the smart fixture 120, for example.

For example, an individual user may have a subscription and/or rental for access. Alternatively or in addition, a nearby store owner may have a rental and/or subscription to provide communications and/or application(s) to users within proximity of the smart fixture 120 (and, therefore, within proximity of the store), for example.

At block 910, if authorization is not granted, then interaction with the user and/or device 150 ends. However, if authorization is granted, then, at block 912, an access right to the IaaS capability at the location is associated with the user via the device 150. For example, a command is generated to allow access to the IaaS at the location via the device 150. For example, access to the infrastructure includes communication, application execution, data processing, data storage, etc. The access right can be stored on the device 150, the smart fixture 120, the gateway/access point 508, the cloud platform 502, etc.

FIG. 10 provides further detail regarding an example implementation of block 812 to monitor a limit associated with the authorized access. In the example of FIG. 10, at block 1002, an access limit is determined. For example, the access limit can be preset and/or dynamically determined for a user and/or device 150 based on one or more factors including time, bandwidth, processing power, application execution, data storage, etc.

At block 1004, user and/or device 150 activity is monitored. For example, access to the cloud(s) 502, 518, 606, application(s) 528, data 520, 522, etc., by the device 150 via the fixture 120 (e.g., the communication node 414, etc.) can be monitored (and metered). Device/user activity can be measured based on an amount of data transmitted and/or received via the gateway/access point 508, cloud platform 502, and/or network 604, application 528 usage, data 520, 522 stored, time elapsed, etc.

At block 1006, a usage limit and/or threshold is identified. In some examples, no limit/threshold is imposed. If no limit/threshold is imposed, then activity monitoring continues at block 1004. If a limit/threshold is imposed, then, at block 1008, the monitored user/device activity is compared to a limit and/or threshold associated with usage.

If the activity meets and/or exceeds the limit/threshold, then, at block 1010, the user/device activity is suspended. For example, the user/device is disconnected from the smart fixture 120 infrastructure 500, 501, 503. In other examples, the user/device is provided with reduced QoS after exceeding the usage limit/threshold. Certain functionality may be limited after the user/device exceeds the limit/threshold, for example. In certain examples, the user/device is warned when the activity approaches, meets, and/or exceeds the access limit.

If the activity does meet and/or exceed the limit/threshold, then, at block 1012, user/device activity may continue. Control reverts to block 1004 to monitor user/device activity. In certain examples, the user/device is warned as the activity approaches the access limit.

Figure 11:
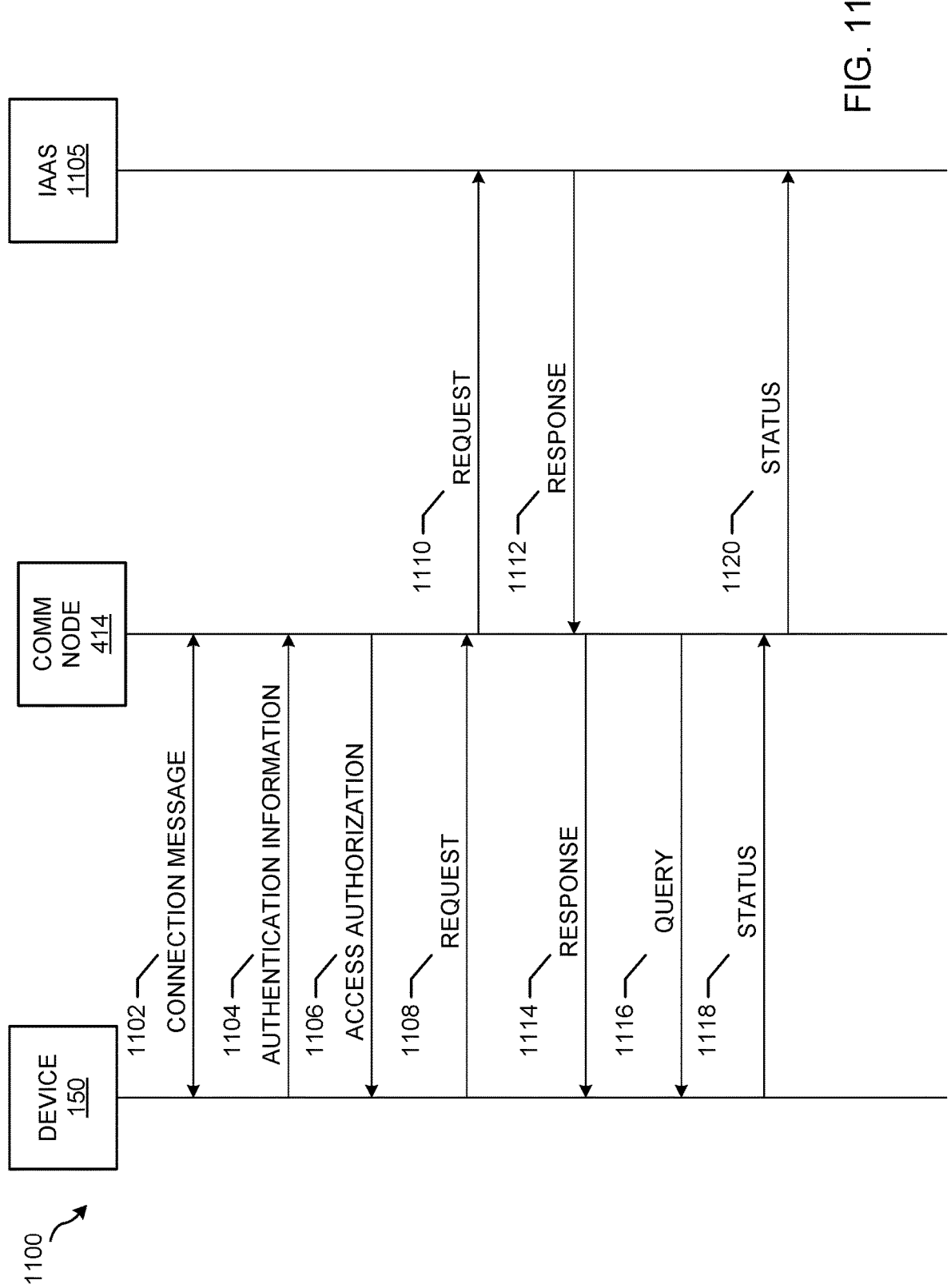
FIG. 11 illustrates a data flow sequence diagram of an example data sequence between a device, a smart fixture, and an infrastructure.

FIG. 11 illustrates a data flow sequence diagram of an example data sequence 1100 between the device 150, the communication node 414, and an infrastructure (e.g., back-end system 500) deployed as an IaaS 1105. At 1102, the device 150 and/or node 414 transmits a message searching for an available connection. For example, the device 150 can broadcast a request searching for a connection, and/or the communication node 414 can emit an informational message advertising the available connection to trigger a response by the device 150 to identify itself.

At 1104, authentication information is provided from the device 150 to the node 414. For example, the authentication information can include a username, user identifier, device identifier, account number and/or other account information, etc., a key and/or other authentication tool, etc.

At 1106, an access authorization is provided from the smart communication node 414 to the device 150. For example, a password, passcode, key, account number, and/or other token or indication of the access right is provided from the node 414 to the device 150. The device 150 can then use the access authorization when communicating with the communication node 414, for example.

At 1108, a request (e.g., message, data, request, command, etc.) for the IaaS 1105 is sent from the device 150 to the node 414. For example, the device 150 may send a communication, request for application execution, data for storage/retrieval, etc. to the IaaS 1105 via the communication node 414. At 1110, the communication node 414 relays the request to the IaaS 1105. For example, the node 414 can route the request via the cellular connection 506, via the gateway/access point 508, etc. At 1112, a response is provided from the IaaS 1105 to the communication node 414. For example, an acknowledge, application, data, and/or other message can be communicated from the IaaS 1105 (e.g., from the cloud 502, 518, 606, etc.) to the node 414, which, at 1114, relays the message to the device 150.

At 1116, the communication node 414 queries the device 150 for status. For example, the node 414 can query the device 150 for account information, activity/usage, payment status, etc. At 1118, the device 150 responds to the node 414 with status information. At 1120, the fixture 1003 relays the status information to the IaaS 1105.

At 1122, access control information is provided from the IaaS 1105 to the node 414. For example, instruction to permit and/or prohibit access by the device 150 to the IaaS 1105 is sent to the node 414. At 1124, the node 414 relays the access control information to the device 150. The device 150 can then continue to communicate with the node 414 and IaaS 1105 or cease communicating with the node 414 and IaaS 1105 based on the access control information, for example.

Figure 12:
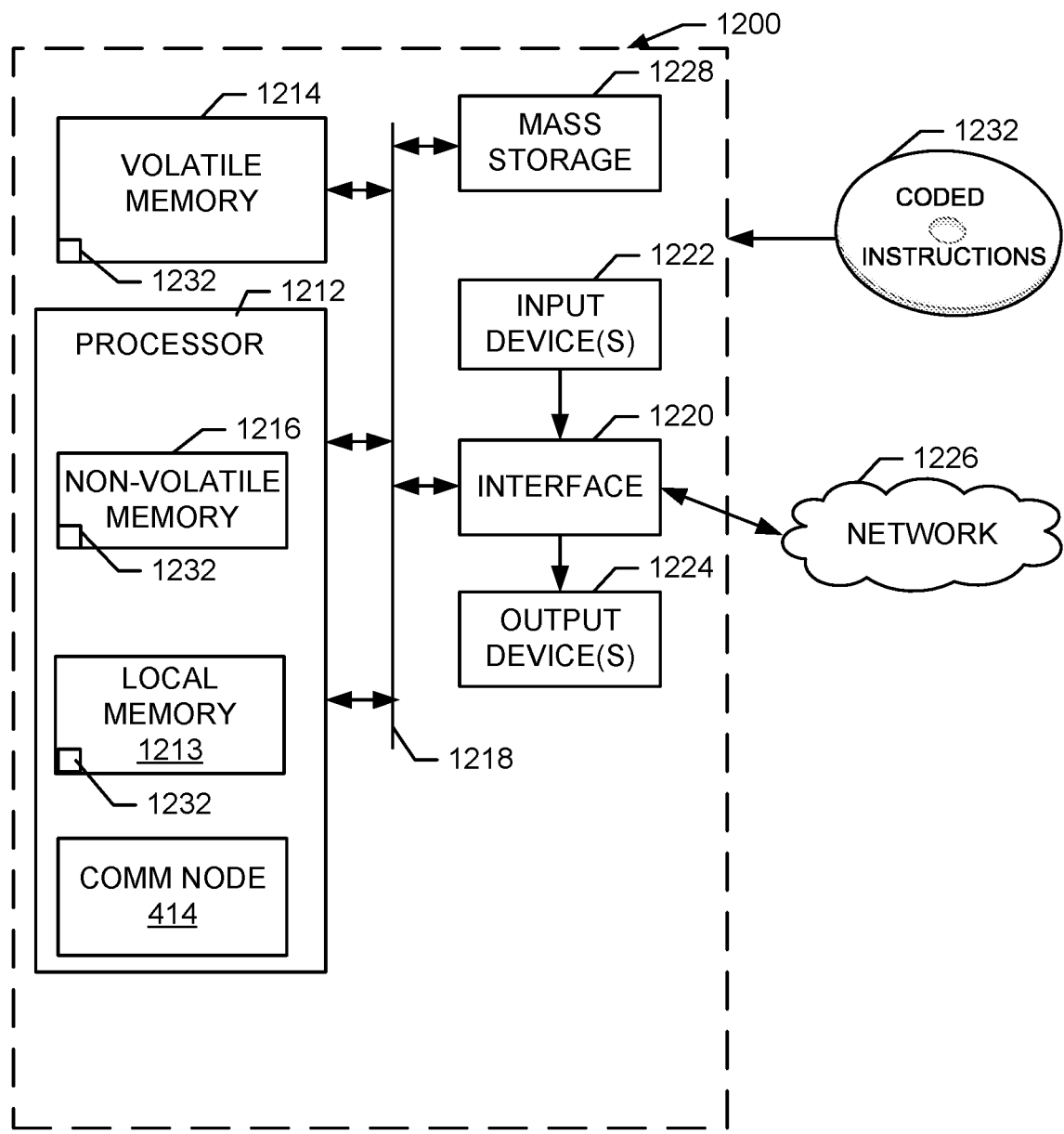
FIG. 12 is a schematic illustration of an example processor platform that may execute the instructions of FIGS. 8-11 to implement the example systems of FIGS. 1-7B.

FIG. 12 is a block diagram of an example processor platform 1200 capable of executing the instructions of FIGS. 8-11 to implement the systems of FIGS. 1-7B. The processor platform 1200 can be, for example, a server, a personal computer, a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, or any other type of computing device. The processor platform 1200 can be used to implement the smart fixture 120 and/or its communication node 414, for example.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a peripheral component interconnect (PCI) express interface.

In the illustrated example, one or more input devices 1222 are connected to the interface circuit 1220. The input device(s) 1222 permit(s) a user to enter data and commands into the processor 1212. The input device(s) 1222 can be implemented by, for example, an audio sensor, a microphone, a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.). In certain examples, a distributed file system can communicate with the processor platform 1200 via the network 1226.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 8-11 may be stored in the mass storage device 1228, in the volatile memory 1214, in the non-volatile memory 1216, and/or on a removable tangible computer readable storage medium such as a CD or DVD.

Thus, certain examples facilitate connection of a device to a network via a lighting fixture including a processor and network connection. Certain examples enable providers to rent bandwidth and/or processing capability via the smart fixture network to provide access and/or content to devices in proximity to the smart fixture. Certain examples enabling varying quality of service including an amount of data, throughput, and how to control the data and/or access based on billing and/or other permission and/or priority.

Certain examples enable rental-based and/or other services including applications involving local sensing. Certain examples provide a scalable computing infrastructure, enabled by the cloud and deployed via an infrastructure as a service. Certain examples can enable access to multiple gateways and/or multiple cloud platforms via a single network-enabled lighting fixture. Certain examples form a first network using the smart lighting fixture, and the first network enables local device communication as well as connection of the device to a second network via the first network. In certain examples, the local first network or "hot spot" formed by the smart lighting fixture can be used for local access such as communication between proximate devices, local multimedia content playback (e.g., music, advertising, other programming, etc.).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A communication node apparatus associated with a light fixture, the communication node apparatus comprising:
   a communication interface having at least two concurrently accessible backhaul transceivers, the at least two backhaul transceivers selected from a group that includes fiber, cellular, and Ethernet;
   a processing infrastructure accessible via the communication interface, the processing infrastructure implemented as an infrastructure-as-a-service (IAAS), the IAAS arranged to selectably provide a plurality of platform services, the plurality of platform services including: an Internet connection, access to a local application, data processing capabilities, and data storage capabilities;
   a sensor to detect an electronic device in proximity to the communication node apparatus;
   a memory arranged to store coded instructions, at least some of the coded instructions arranged to direct operations of the IAAS; and
   a processor arranged to execute the coded instructions stored in the memory, said execution configured to:
   process a selection input received from the electronic device, the selection input selecting at least one of the plurality of platform services;
   process identification information received from the electronic device;
   determine, based on the selection input and the identification information, authorization of the electronic device to access the processing infrastructure;
   facilitate access to the processing infrastructure when the processor determines the electronic device is authorized; and
   monitor and control access to the processing infrastructure by the electronic device according to an access condition.

2. The apparatus of claim 1, further including a light.

3. The apparatus of claim 1, wherein the processor is to operate with the communication interface to execute instructions to form a first network to enable communication with a second network, the first network accessible based on proximity to the sensor.

4. The apparatus of claim 1, wherein the processor is to determine authorization based on at least one of a rental agreement, a subscription, or a metered charge.

5. The apparatus of claim 1, wherein the processing infrastructure includes a cloud platform.

6. The apparatus of claim 1, wherein the processing infrastructure includes local content.

7. The apparatus of claim 1, wherein the processing infrastructure includes at least one of access to data and access to processing resources.

8. A method comprising:
   providing a processing infrastructure, the processing infrastructure implemented as an infrastructure-as-a-service (IAAS), the IAAS arranged to selectably provide a plurality of platform services, the plurality of platform services including: an Internet connection, access to a local application, data processing capabilities, and data storage capabilities;
   detecting, using a sensor in a communication node associated with a light fixture, an electronic device in proximity to the communication node;
   receiving a selection input from the electronic device, the selection input selecting at least one of the plurality of platform services;
   receiving identification information from the electronic device;
   determining, using a processor in the communication node and based on the selection input and the identification information, authorization of the electronic device to access the processing infrastructure;
   facilitating, using a communication interface in the communication node, access to the processing infrastructure when the processor determines the electronic device is authorized;
   providing backhaul via the communication interface, the backhaul communicating through one of at least two concurrently accessible backhaul mediums, the at least two concurrently accessible backhaul mediums selected from a group that includes fiber, cellular, and Ethernet; and
   monitoring and controlling, using the processor, access to the processing infrastructure by the electronic device according to an access condition.

9. The method of claim 8, wherein the communication node further includes a light.

10. The method of claim 8, further including forming a first network to enable communication with a second network, the first network accessible based on proximity to the sensor.

11. The method of claim 8, wherein determining authorization of the electronic device includes determining authorization based on at least one of a rental agreement, a subscription, or a metered charge.

12. The method of claim 8, wherein the processing infrastructure includes a cloud platform.

13. The method of claim 8, wherein the processing infrastructure includes local content.

14. The method of claim 8, wherein the processing infrastructure includes at least one of access to data and access to processing resources.

15. A tangible computer readable storage medium comprising computer readable instructions which, when executed, cause a processor in a communication node associated with a light fixture, to at least:

detect, using a sensor in the communication node, an electronic device in proximity to the communication node;

receive a selection input from the electronic device, the selection input selecting at least one of a plurality of platform services of a processing infrastructure, wherein the processing infrastructure is implemented as an infrastructure-as-a-service (IAAS), the IAAS arranged to selectably provide the plurality of platform services including: an Internet connection, access to a local application, data processing capabilities, and data storage capabilities;

receive identification information from the electronic device;

determine, based on the selection input and the identification information, authorization of the electronic device to access the processing infrastructure;

facilitate, using a communication interface in the communication node, access to the processing infrastructure when the processor determines the electronic device is authorized;

provide backhaul via the communication interface, the backhaul arranged to communicate through one of at least two concurrently accessible backhaul mediums, the at least two concurrently accessible backhaul mediums selected from a group that includes fiber, cellular, and Ethernet; and monitor and control access to the processing infrastructure by the electronic device according to an access condition.

16. The storage medium of claim 15, wherein the communication node further includes a light.

17. The storage medium of claim 15, wherein the instructions, when executed, further cause the processor to form a first network to enable communication with a second network, the first network accessible based on proximity to the sensor.

18. The storage medium of claim 15, wherein the instructions, when executed, cause the processor to determine authorization of the electronic device by determining authorization based on at least one of a rental agreement, a subscription, or a metered charge.

19. The storage medium of claim 15, wherein the processing infrastructure includes at least one of a cloud platform or local content.

20. The storage medium of claim 15, wherein the processing infrastructure includes at least one of access to data and access to processing resources.

* * * * *